United States Patent [19]

Correll

[11] Patent Number: 4,852,856
[45] Date of Patent: Aug. 1, 1989

[54] SYSTEM FOR LAYING COMMUNICATIONS CABLE ESPECIALLY ADAPTED FOR AERIALLY STRINGING FIBER OPTIC CABLE AND ADAPTED FOR INTERCHANGEABLE USE WITH CONVENTIONAL CABLE

[76] Inventor: Daniel J. Correll, 104 Seymour Rd., Woodbridge, Conn. 06525

[21] Appl. No.: 141,045

[22] Filed: Jan. 5, 1988

[51] Int. Cl.$^4$ .................................. B65H 59/00
[52] U.S. Cl. .................. 254/134.3 R; 254/134.3 FT
[58] Field of Search ............... 254/134.3 R, 134.3 FT, 254/134.4

[56] References Cited

U.S. PATENT DOCUMENTS

| | | | |
|---|---|---|---|
| 4,468,003 | 8/1984 | Nonclercq et al. | 254/134.3 FT |
| 4,502,666 | 4/1985 | Mattelon et al. | 254/134.3 FT |
| 4,576,362 | 3/1986 | Langston | 254/134.3 FT |
| 4,609,180 | 9/1986 | Fisher et al. | 254/134.3 R |
| 4,635,875 | 1/1987 | Apple | 242/155 BW X |
| 4,643,370 | 2/1987 | Pierce | 254/134.3 R |
| 4,695,038 | 9/1987 | Giroux | 254/134.3 FT |
| 4,726,566 | 2/1988 | Boland et al. | 254/325 |

Primary Examiner—William L. Sikes
Assistant Examiner—Akm E. Ullah

[57] ABSTRACT

A system for laying communications cable that includes a reel of fiber optic cable mounting on a vehicle. The cable is unreeled and looped around a capstan wheel. An hydraulic motor used to rotate the capstan wheel may over spin when pulling cable off the capstan wheel or free spin when rewinding cable back onto the reel. The hydraulic motor output is torque limited when tension in the fiber optic cable between the reel and the capstan wheel exceeds a predetermined amount, thereby reducing the tension in the fiber optic cable. The hydraulic motor may also be disabled to permit free spinning of the capstan wheel when conventional cable is being laid. The system also includes reel brakes to prevent undesired pay-out of cable, with the magnitude of the braking force depending upon whether the associated reel carries delicate fiber optic cable or relatively strong conventional cable. The system includes a hydraulic reel drive assembly for rewinding cable with relief valves for disabling the reel drive when cable tension exceeds a predetermined amount. The system further includes fiber optic cable guide chutes adapted to be selectively mounted in conventional guide rollers. The system also includes a blade assembly for preventing overlapping of the cable around the capstan wheel and a peripheral shroud for selectively preventing disengagement of the cable from around the capstan wheel.

38 Claims, 6 Drawing Sheets

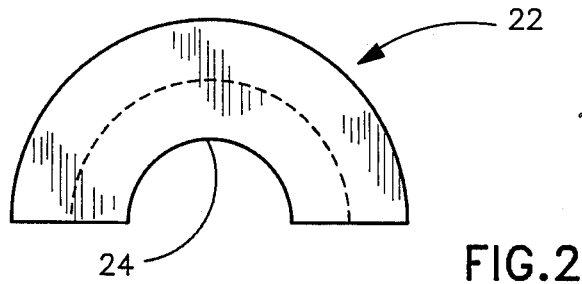
FIG.2
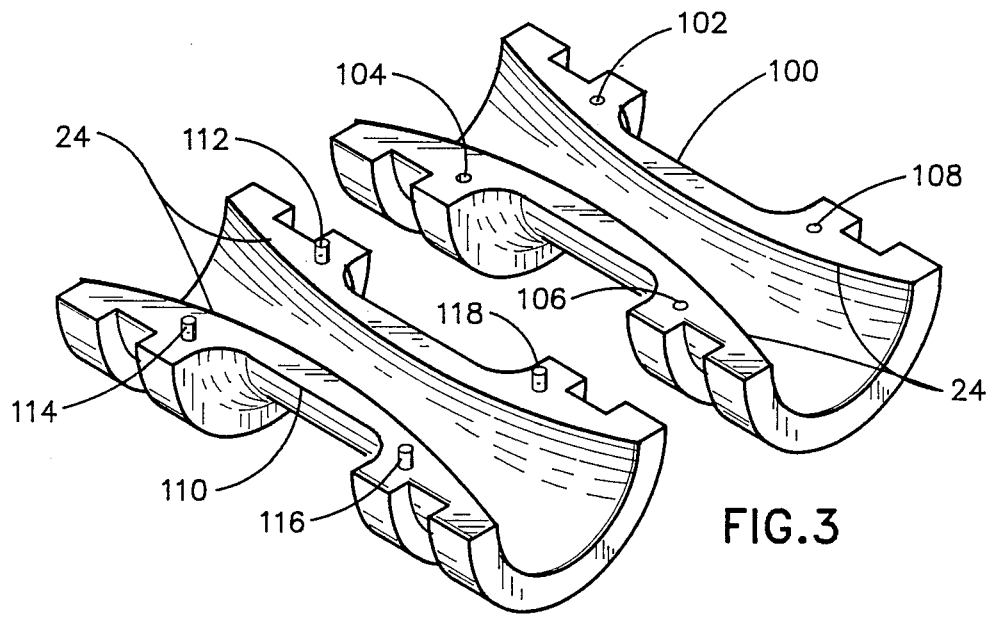
FIG.3
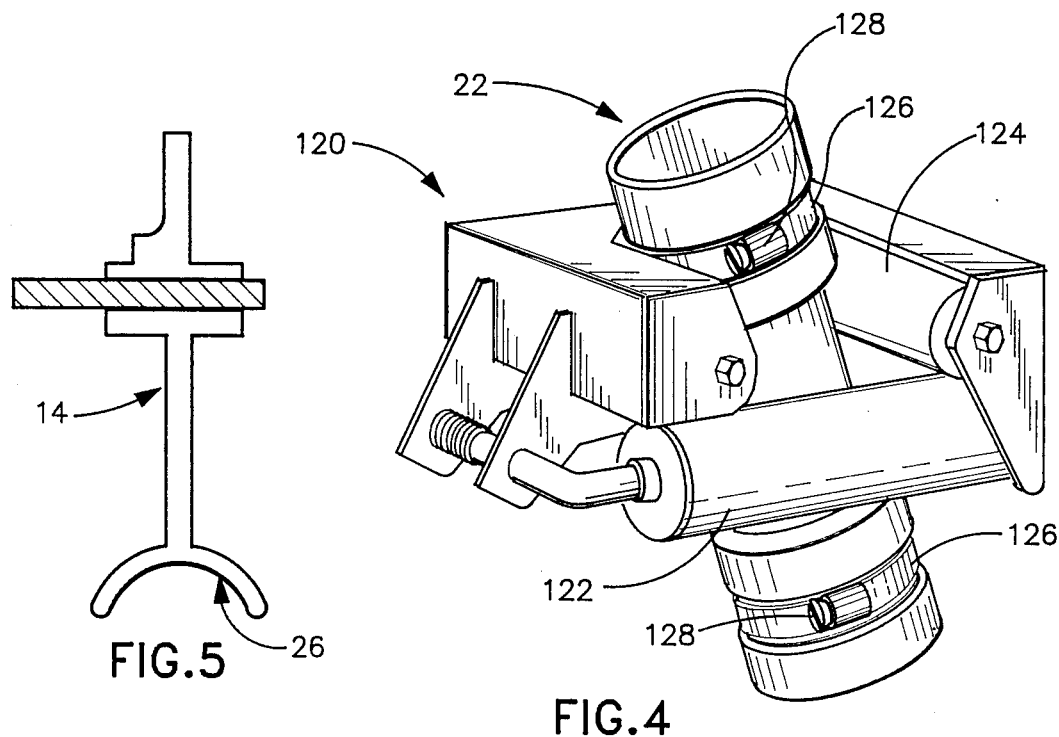
FIG.5
FIG.4

SYSTEM FOR LAYING COMMUNICATIONS CABLE ESPECIALLY ADAPTED FOR AERIALLY STRINGING FIBER OPTIC CABLE AND ADAPTED FOR INTERCHANGEABLE USE WITH CONVENTIONAL CABLE

BACKGROUND OF THE INVENTION

Fiber optic cable is composed of a bundle of long, thin fibers of glass, plastic or other transparent material enclosed within a protective sheath. Modulated light pulses are transmitted through the fibers, which results in transmission of communications signals. Fiber optic cable is preferred over conventional cable such as copper cable because the fiber optic cable is lightweight, relatively thin, better preserves the signal characteristics, and carries a much higher rate and volume of information.

Fiber optic cable is more delicate and difficult to lay than conventional cable because it is relatively weak and brittle. Tension within the fibers will produce stresses, which in turn lead to fracturing and other physical modifications of the fibers. Such modifications of the fiber destroy or deteriorate the signal transmission characteristics of the fibers.

U.S. Pat. Nos. 4,468,003; 4,502,666; and 4,576,362 disclose systems for laying underground fiber optic cable. Some of the systems use capstans to assist in pulling the fiber optic cable through underground conduits and include means for maintaining the cable tension below a predetermined maximum. The environment of underground cable laying is significantly different from the environment of aerially stringing a cable, which normally involves mounting a reel of cable on a vehicle and unwinding the cable onto poles as the vehicle moves. Because the vehicle may accelerate at various rates, move at various velocities, go up and down terrain, turn corners, etc., the tension on the fiber optic cable may vary quickly and drastically. Consequently, the environment of aerially stringing fiber optic cable gives rise to problems different from those encountered in the environment of laying fiber optic cable underground.

One known method of aerially stringing fiber optic cable involves the use of strand support cable that has been previously suspended from a series of poles. First, several spaced pulley blocks are hung from the strand cable, then a tow line is fed through each of the blocks from the ending point to the beginning point where the fiber optic cable is to be run. An end of the fiber optic cable is attached to the end of the tow line at the beginning point of the run, and the tow line is drawn back through the series of spaced pulley blocks, towing the fiber optic cable behind. The tow line is pulled back to the ending point of the run, leaving the fiber optic cable strung through the blocks. Thereafter, a lashing machine is towed along the strand cable and fastens the fiber optic cable and the strand cable together while pushing the pulley blocks ahead for later removal. This method of stringing fiber optic cable moderates the magnitude of tensions within the fiber optic cable, but is very time consuming to perform and usually requires three or more people and two or more vehicles.

A second method of aerially stringing fiber optic cable also utilizes a preexisting strand cable. In this second method, fiber optic cable is unreeled from a vehicle up to a lashing machine which fastens the fiber optic cable and the strand cable together. This method is relatively fast and requires relatively few people and vehicles to perform the operation. Nevertheless, tension in the fiber optic cable can vary quickly and drastically as the vehicle moves. Also, if the vehicle cannot move close to the pole line to which the cable is being strung, then the cable cannot easily traverse from the reel mounted on the vehicle, and over to the lashing machine and the strand cable, thereby increasing the risk of cable damage. Moreover, when the vehicle slows or stops, the reel of fiber optic cable can continue to spin, which results in uncontrolled cable pay-out, which in turn can cause possible cable damage.

A third, very recent method of aerially stringing fiber optic cable involves inserting a fiber optic cable in a continuous plastic carrier tube and lashing the tube to strand support cable. This method incorporates the use of a reel handling trailer that is towed behind the cable laying vehicle. The reel trailer carries the plastic tube that is fed from the trailer to the rear of the cable laying vehicle, where a reel of fiber optic cable is mounted. The fiber optic cable and plastic tube are pulled together into a slitter-inserting tool whereby the plastic tube is slit open and the fiber optic cable is inserted inside the plastic tube. Then the plastic tube with fiber optic cable inside is lashed to a strand support. This method involves the use of a separate, bulky, expensive piece of equipment towed by the cable laying vehicle and requires additional set up time. This system greatly limits the maneuverability of the vehicle and sometimes inhibits access to pole lines. Additionally, since the fiber optic cable is free to slide inside the plastic tube, there exists the problem of long, steep, down hill runs, where the fiber optic cable (due mainly to vibration) eventually slides down inside the plastic tube. Such sliding creates high tension in the cable at the top of the run and also causes the fibers and/or cable to buckle due to column loading near the bottom of the run. This tension and buckling very easily causes micro-fracturing in the fibers, thereby greatly interfering with the transmission of light by the fibers.

A fourth method of aerially stringing fiber optic cable uses cable consisting of a strand support cable and an adjacent fiber optic cable molded together with a plastic sheath. Although the process of aerially stringing this cable is relatively easy and the cable will substantially eliminate damage to the fibers from longitudinal tension, any excessive bending or pressure contact of the cable will still damage the fibers. Moreover, the cost of the cable is extremely high due to the complicated fabrication of the cable. In addition, this self-support cable suffers from a major limitation in that when future expansion is warranted to provide additional communication services as the result of customer growth, new cable lines can not be lashed onto the self-support cable, unlike the more conventional method of direct lashing to strand support cable where additional cables can be easily lashed on top of each other. In many cases, existing self-support cables must be completely removed to relay higher capacity self-support cables, thereby substantially increasing the time and cost of expanding communication services.

In accordance with the description of the present invention herein, the term "laying cable" is deemed to include aerially stringing cable, laying cable in underground conduits, and other methods of extending a cable from one point to another point.

SUMMARY OF THE INVENTION

The present invention relates to a system for laying communications cable that includes a reel of fiber optic cable mounted on a vehicle. The cable is unreeled and looped around a capstan wheel. An hydraulic motor used to rotate the capstan wheel may be disabled when the cable is pulled off the capstan wheel at a rate greater than a predetermined maximum so that the capstan wheel over spins or when rewinding the cable back onto the reel, so that the capstan wheel free spins. The hydraulic motor output is torque limited when tension in the fiber optic cable between the reel and the capstan wheel exceeds a predetermined amount, thereby reducing the torque output of hydraulic motor and correspondingly reducing the torque of the capstan wheel, which reduces the tension in the fiber optic cable. The hydraulic motor may also be disabled to permit free spinning of the capstan wheel when conventional cable is being laid, thereby permitting ready interchangeability of the system for both fiber optic and conventional cable use. The system also includes reel brakes to prevent undesired pay-out of cable, with the magnitude of the braking force depending upon whether the associated reel carries delicate fiber optic cable or relatively strong conventional cable. The system includes a hydraulic reel drive assembly for rewinding cable with relief valves for disabling the reel drive when cable tension exceeds a predetermined amount. The system further includes guide chutes adapted to be selectively mounted in conventional guide rollers for interchangeable use with conventional cable and fiber optic cable. The system also includes a blade assembly for preventing overlapping of the cable around the capstan wheel and a peripheral shroud for selectively preventing disengagement of the cable from around the capstan wheel.

BRIEF DESCRIPTION OF THE DRAWINGS

The present invention will be described with reference to the accompanying drawings, wherein:

FIG. 2 is a schematic end view of one of two bilaterally symmetrical segments of a guide chute used in the system of the present invention;

FIG. 3 is a perspective view of the two cooperatingly mating guide chute segments used in the system of the present invention;

FIG. 4 is a perspective view of a guide chute mounted in a conventional guide roller assembly according to the present invention;

FIG. 5 is a schematic, partial cross-sectional view of a capstan wheel used in the system of the present invention;

DESCRIPTION OF A PREFERRED EMBODIMENT

Figure 1:
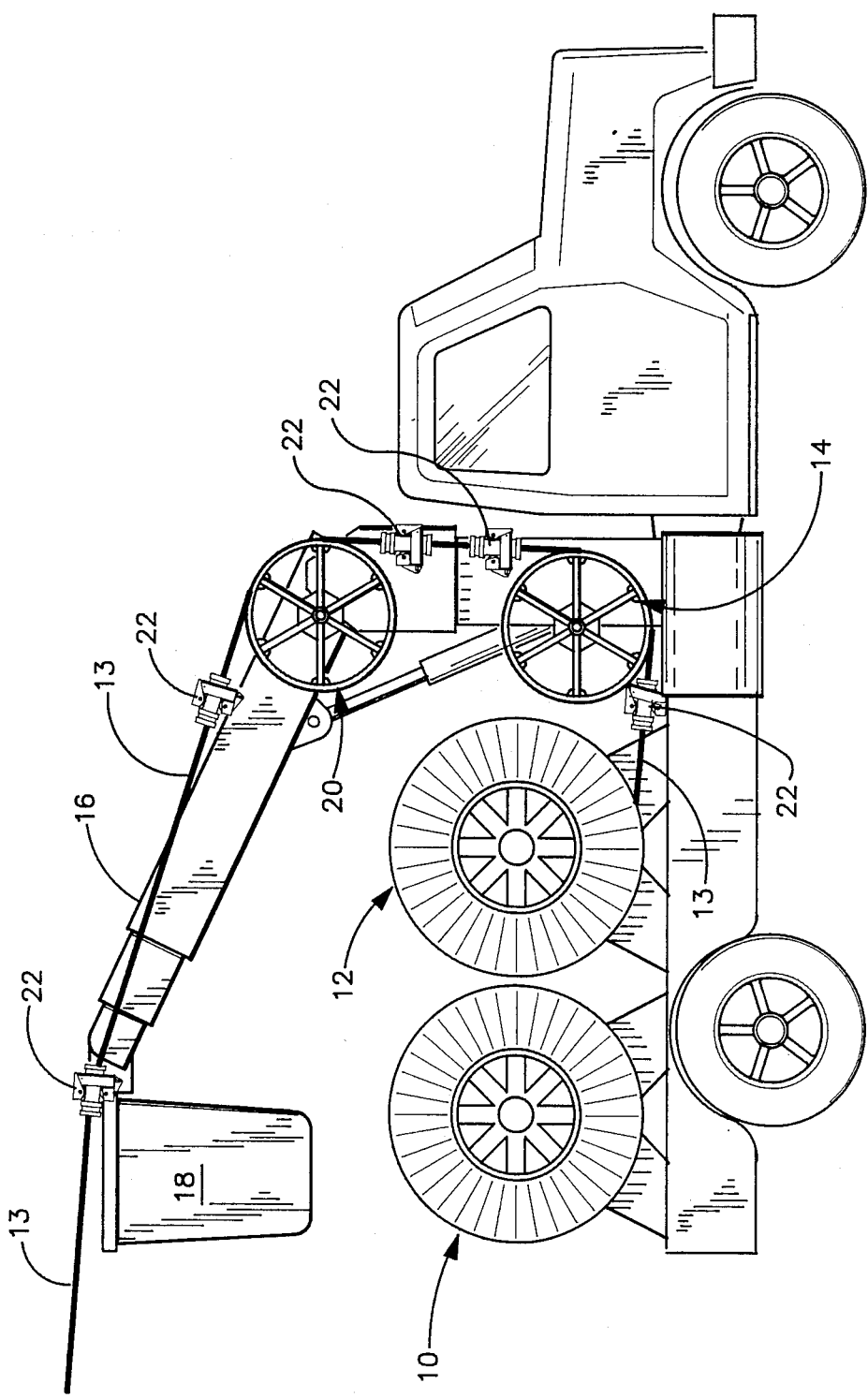
FIG. 1 is a schematic side view of a vehicle equipped with the cable laying system of the present invention.

The invention will now be described with reference to the accompanying drawings wherein like reference numerals refer to the same item.

There is shown in FIG. 1 a vehicle such as a truck. Mounted on the truck bed are a reel 10 of conventional cable (such as copper cable), a reel 12 of fiber optic cable 13, a capstan wheel 14, and an extensible boom 16. A bucket 18 is mounted on the distal end of the extensible boom 16, and an idler wheel 20 is mounted near the base of the boom 16, above the capstan wheel 14. Fiber optic cable 13 is pulled off the reel 12, looped at least once around the capstan wheel 14 and looped at least partially around the idler wheel 20, past the bucket 18 and up to a pole (not shown). The fiber optic cable 13 may be aerially strung between poles either by itself or by lashing to a preexisting strand cable. To help deliver the fiber optic cable 13 up to a pole, a series of chutes 22 are placed at various points between the reel 12 and the bucket 18.

When conventional cable is being aerially strung, such cable is guided along a path from an associated reel 10 to the bucket 18 by means of conventional guide roller assemblies, such as guide roller assemblies manufactured by Pierce-Correll Corporation located in Milford, Connecticut and installed on its truck model "PCPT" plant placer. The chutes 22 of the present invention are adapted to be interchangeably mounted between and held by the rollers in the conventional guide roller assemblies, so that the cable laying system is readily interchangeable for use with either conventional cable or fiber optic cable. Conventional guide rollers potentially cause severe damage to fiber optic cable because the rollers have a relatively small diameter on the order of two inches and result in substantially point contact between the fiber optic cable and the rollers. Consequently, the fiber optic cable can be bent significantly in the region of the guide rollers, which might cause damage to the fibers, especially if the fiber optic cable is under relatively great tension. The chutes 22 of the present invention overcome these disadvantages associated with conventional guide rollers.

As shown in FIGS. 2, 3, and 4, each chute 22 comprises two bilaterally symmetrical, cooperatingly mating segments. As best shown in FIG. 3, one segment 100 possesses four holes 102, 104, 106, 108 and the other segment 110 possesses four integrally fashioned prongs or pins 112, 114, 116, 118 adapted to be snugly and conformingly received by a corresponding hole 102, 104, 106, 108. Each chute 22 possesses a tunnel, the walls 24 of which are convex and fashioned substantially in the arc of a circle. Preferably, the radius of the arc is fifteen inches. Thus, it will be appreciated that each chute 22 helps minimize the degree of localized bending of a fiber optic cable and helps ensure that the fiber optic cable contacts the tunnel walls 24 of the chute 22 in substantially line contact. Preferably, such line contact is about ten inches long.

Although the chutes 22 may be used advantageously with conventional cable, the present invention contemplates that each chute 22 will be interchangeable with the rollers of an associated conventional guide roller assembly so that the rollers can be used when aerially stringing conventional cable and the chutes 22 can be used when aerially stringing fiber optic cable. As best shown in FIG. 4, the chute 22 is adapted to be mounted in a conventional guide roller assembly 120 including a plurality of guide rollers (only two of which are shown) 122, 124 forming a square opening through which cable passes such that the cable is bounded by guide rollers. One of the guide rollers 122 is designed to pivot about a pin like a door and can be selectively latched in a closed position. In operation, the guide roller 122 is unlatched and pivoted open, the (conventional) cable is placed in the square opening, and the guide roller 122 is latched in a closed position. The cable is removed by a reverse operation. To adapt the guide roller assembly 120 for use with fiber optic cable, the cable is first placed between the two chute segments 100, 110, then the two chute segments 100, 110 are joined such that the pins 112, 114, 116, 118 are inserted into the corresponding holes 102, 104, 106, 108, then a steel band 126 is tightly wrapped around each chute end and retained by a clamp 128; next, the guide roller 122 is unlatched and pivoted open, the chute 22 with the cable is placed in the square opening, and the guide roller 122 is latched in a closed position. Again, the fiber optic cable is removed by a reverse operation. Because the chute ends possess a diameter greater than the width of the square opening, the chute 22 is retained and held in place by the guide rollers. It should thus be appreciated that the chute 22 can be used to interchangeably adapt the guide roller assembly 120 for use with fiber optic cable instead of conventional cable. Moreover, the invention contemplates that the chute 22 can be used with either conventional or fiber optic cable.

Figure 7:
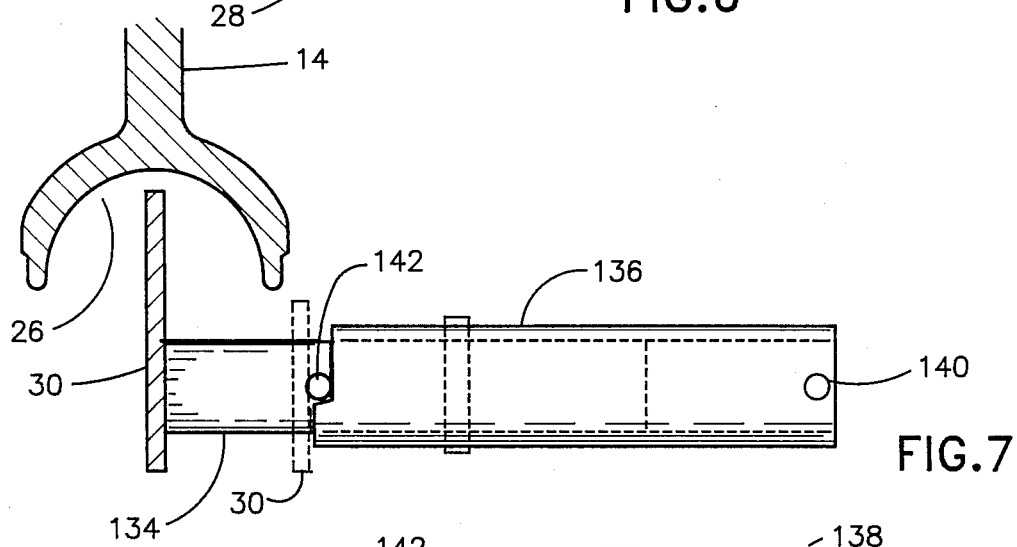
FIG. 7 is a side view of the blade assembly shown in FIG. 6 with the blade in an extended position.

The capstan wheel 14 preferably includes a circumferential periphery generally forming a continuous concave channel 26, as best shown in FIGS. 5 and 7. Preferably, the channel 26 is of a width such that at least two segments of optic fiber cable may be disposed within the confines of the channel 26. Also, the radius of curvature of the channel 26 is such that tightening of the fiber optic cable about the circumferential periphery of the capstan wheel 14 and the attendant compression of the fiber optic cable against the channel 26 will result in minimal compression and damage to the fibers. Thus, the channel 26 is preferably formed in the fashion of an arc of a circle having a radius of two inches.

Figure 6:
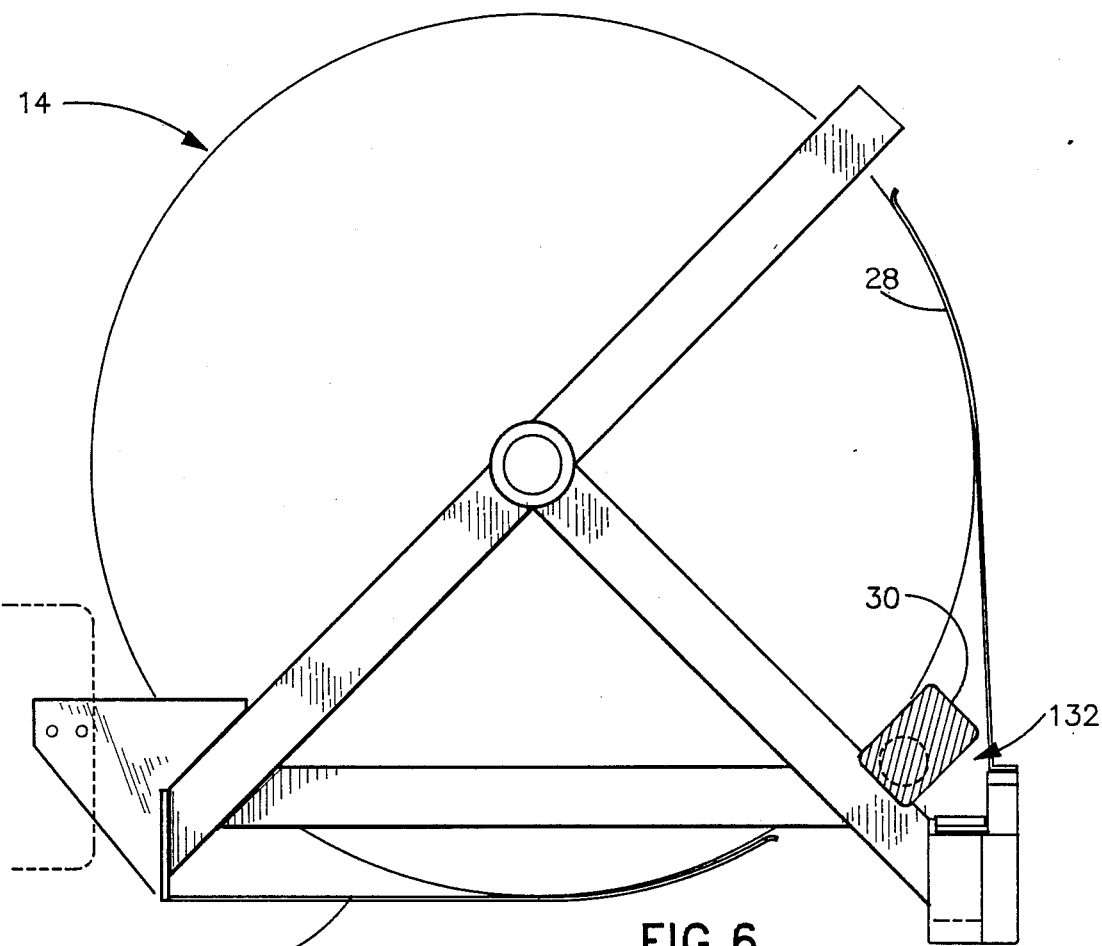
FIG. 6 is a partially schematic side view of a capstan wheel assembly including a blade assembly and a peripheral shroud used in the system of the present invention.
Figure 8:
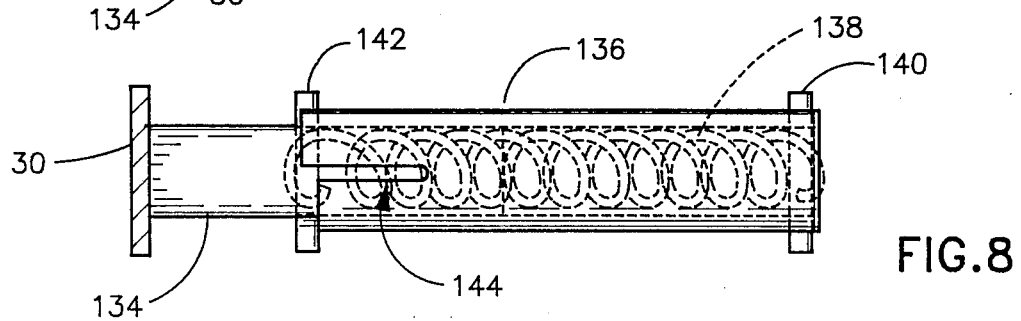
FIG. 8 is a bottom view of the blade assembly shown in FIG. 7.

Because the fiber optic cable sometimes becomes slack and at other times taunt around the circumferential periphery of the capstan wheel 14, it is important to insure that the fiber optic cable is retained near and substantially within the confines of the channel 26 and also to prevent the fiber optic cable from overlapping itself around the capstan wheel 14. Consequently, the present invention contemplates a peripheral shroud 130 and a blade assembly 132 as best shown in FIGS. 6, 7, and 8.

The peripheral shroud 28 arcuately extends about a portion of the capstan wheel periphery. The shroud 28 is preferably wide enough to extend across the width of the channel 26 and is spaced from the channel 26 a sufficient distance to prevent the fiber optic cable from slipping between the channel 26 and the shroud 28. The shroud 28 is fashioned of thin metal and is mounted at one end thereof to the frame upon which the capstan wheel 14 is mounted. Consequently, the shroud 28 is resilient and springy so that the shroud 28 can be manually pulled away from the capstan wheel periphery to insert or remove cable. Upon release, the shroud 28 will assume a position close to the capstan wheel periphery so as to retain the cable therein.

The blade assembly 132 includes a generally rectangular shaped plate or blade 30 having rounded corners. The blade 30 is eccentrically mounted to the distal end of a piston 134 such as by welding. The piston 134 is translatable within a cylinder 136, and a extensionable coil spring 138 is disposed within the cylinder 136. An end of the extensionable coil spring 138 is secured to a pin 140 extending laterally through the bottom of the cylinder, and the other end of the extensionable coil spring 138 is secured to the inner end of the piston 134. A second pin 142 extends through the piston 134 at a location near, but spaced from, the blade 30. Each end of the pin 142 is adapted to slidably extend within a corresponding slot 144 longitudinally extending from the outer end of the cylinder 136. When the pin 142 is aligned with the longitudinal slots 144, the force of the extension spring 138 causes the piston 134 to retract within the cylinder and to move the blade 30 away from the capstan wheel periphery. The orientation of the blade 30 when the pin 142 is so aligned with the longitudinal slot 144 is such that the blade 30 is disposed out of the capstan wheel periphery channel 26. The blade 30 and the piston 134 may be manually pulled against the bias of the extension spring 136 so that the pin 142 is concurrently pulled out of the longitudinal slot 144. Thereafter, the blade 30 and the pin 134 can be rotated so that the ends of the pin 142 rest in associated notches or recesses formed in the outer end of the cylinder 136. The notches are located ninety degrees relative to the longitudinal slots 144. When the ends of the pin 142 are disposed in the notches, then the blade 30 is oriented toward and disposed within the channel 26. In order to help retain the ends of the pin 142 in the notches and inhibit the pin 142 from becoming undesirably aligned with the longitudinal slots 144, the extensible coil spring 138 may be rotated or twisted within the cylinder 136 so that the spring 138 also possesses a torsional bias and tending to rotate the piston 134 and the pin 142 toward the notches. Moreover, any frictional forces caused by the cable brushing against the blade 30 will also tend to retain the ends of the pin 142 in the notches.

As best shown in FIG. 7, the fiber optic cable is looped around the circumferential periphery of the capstan wheel 14 such that adjacent segments of the optic fiber cable are disposed on opposite sides of the blade 30. It should also be appreciated that a plurality of laterally spaced blades 30 extending radially inwardly from the plate 28, may be used when the cable is looped more than once around the capstan wheel 14. The blade 30 is shaped and fashioned so as to provide minimal fiction with the adjacent fiber optic cable segments. Consequently, the blade 30 is provided with a relatively narrow and rounded, but not sharp, leading edge 32 and is preferably fashioned of plastic. It should be appreciated that one or more blade assemblies may be appropriately disposed about the circumferential periphery of the capstan wheel 14.

Figure 9:
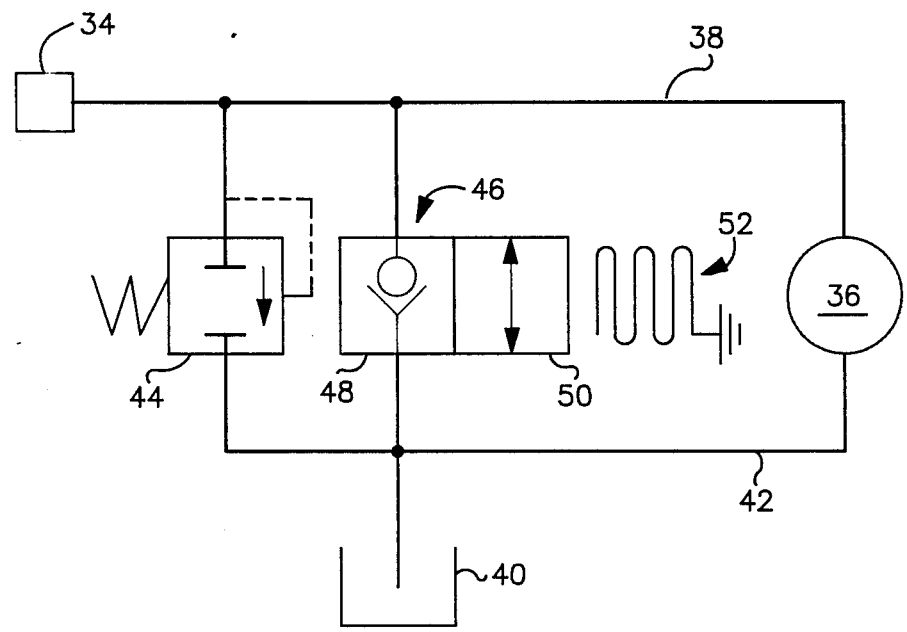
FIG. 9 is a schematic diagram of the hydraulic system for the motor driving the capstan wheel in the system of the present invention.
Figure 10:
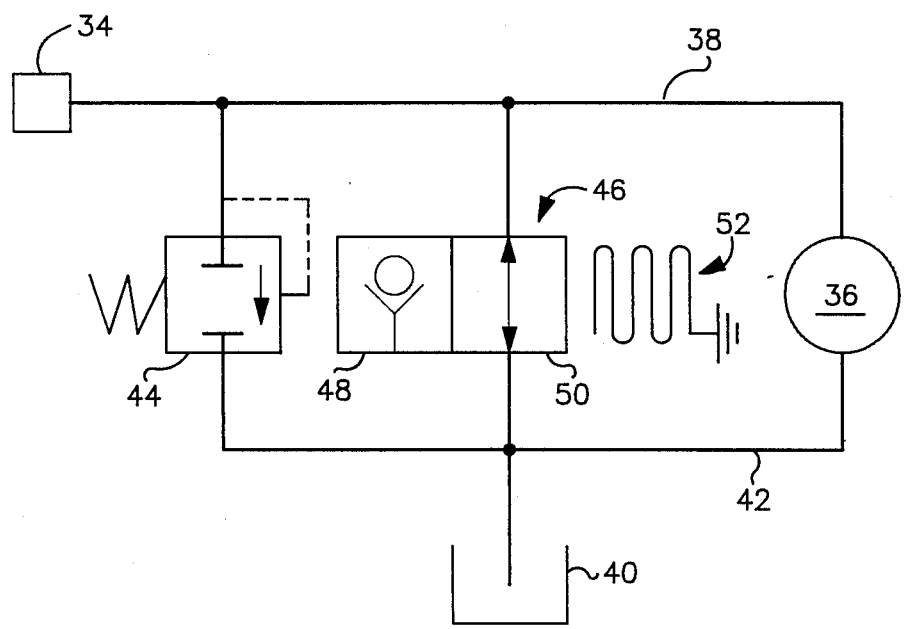
FIG. 10 is a schematic diagram of the hydraulic system depicted in FIG. 9 in a different mode of operation.

The capstan wheel 14 is rotated at a selected, variable, predetermined radial speed by an hydraulic drive system. A schematic diagram of the hydraulic drive system is shown in FIGS. 9 and 10. The hydraulic drive system includes a source of pressurized fluid 34, an hydraulic motor 36, a delivery conduit 38 in fluid communication between the pressurized fluid source 34 and the hydraulic motor 36, a reservoir or tank 40 for containing the fluid, and a discharge conduit 42 in fluid communication between the hydraulic motor 36 and the tank 40. The hydraulic drive system further includes a relief valve 44 in fluid communication with the delivery conduit 38 and the discharge conduit 42 and a combination valve 46 in fluid communication with the delivery conduit 38 and the discharge conduit 42. The combination valve 46 includes a so-called floating ball valve 48 and a bi-directional free flow valve 50. A solenoid 52 may be activated to position floating ball valve 48 or deactivated to position a bi-directional free flow valve 50 in fluid communication between the delivery conduit 38 and the discharge conduit 42. The floating ball valve 48 is positioned to provide one directional flow from the discharge conduit 42 to the delivery conduit 38 when the pressure of the fluid within the discharge conduit 42 exceeds the pressure of the fluid within the delivery conduit 38.

The hydraulic drive system operates as follows. The solenoid 52 is activated such that the floating ball valve 48 is in fluid communication between the delivery conduit 38 and the discharge conduit 42. Pressurized fluid from the pressurized fluid source 34 passes through the delivery conduit 38 to the hydraulic motor 36, turning the same at a constant, preselected speed, which in turn causes the capstan wheel 14 also to turn at a constant, predetermined speed. The pressurized fluid is discharged from the hydraulic motor 36 through the discharge conduit 42 to the tank 40. Since the pressure of the fluid within the discharge conduit 42 is less than the pressure within the delivery conduit 38, the fluid will not flow through floating ball valve 48. If the capstan wheel 14 and the associated hydraulic motor 42 experience a relatively high load, such as when the cable tension between the reel 12 and the capstan wheel 14 is relatively high, then the pressure within the delivery conduit 38 will build up. When the pressure within the delivery conduit 38 reaches a predetermined amount, then the relief valve 44 will open and provide fluid communication between the delivery conduit 38 and the discharge conduit 42 so that the pressurized fluid in the delivery conduit 38 is diverted to the tank 40, thereby reducing the drive torque of the hydraulic motor 36 and permitting the capstan wheel 14 to reduce its output torque.

If the cable is being pulled off its associated reel and off the capstan wheel 14 at a rate faster than the capstan wheel 14 is being rotated (at a constant, predetermined speed) by the hydraulic motor 36, such as when the vehicle upon which the reel is mounted travels at a relatively high rate of speed, then the pressure in the discharge conduit 42 will be higher than the pressure in the delivery conduit 38, the fluid will flow from the discharge conduit 42 through the floating ball valve 48 back to the delivery conduit 38 in a circulating manner, and the capstan wheel 14 will over spin freely in one direction of rotation.

If fiber optic cable is rewound onto a reel, then the solenoid 52 is de-energized so as to place the bi-directional free flow valve 50 in fluid communication between the delivery conduit 38 and the discharge conduit 42, thereby causing pressure between the delivery conduit 38 and the discharge conduit 42 to be equalized and permitting the capstan wheel 14 to free spin in either direction of rotation. If conventional cable is being either unreeled or rewound, then the solenoid 52 is de-energized likewise so that the bi-directional free flow valve 50 is placed in fluid communication between the delivery conduit 38 and the discharge conduit 42, again permitting the capstan wheel 14 to free spin in either direction of rotation.

Figure 11:
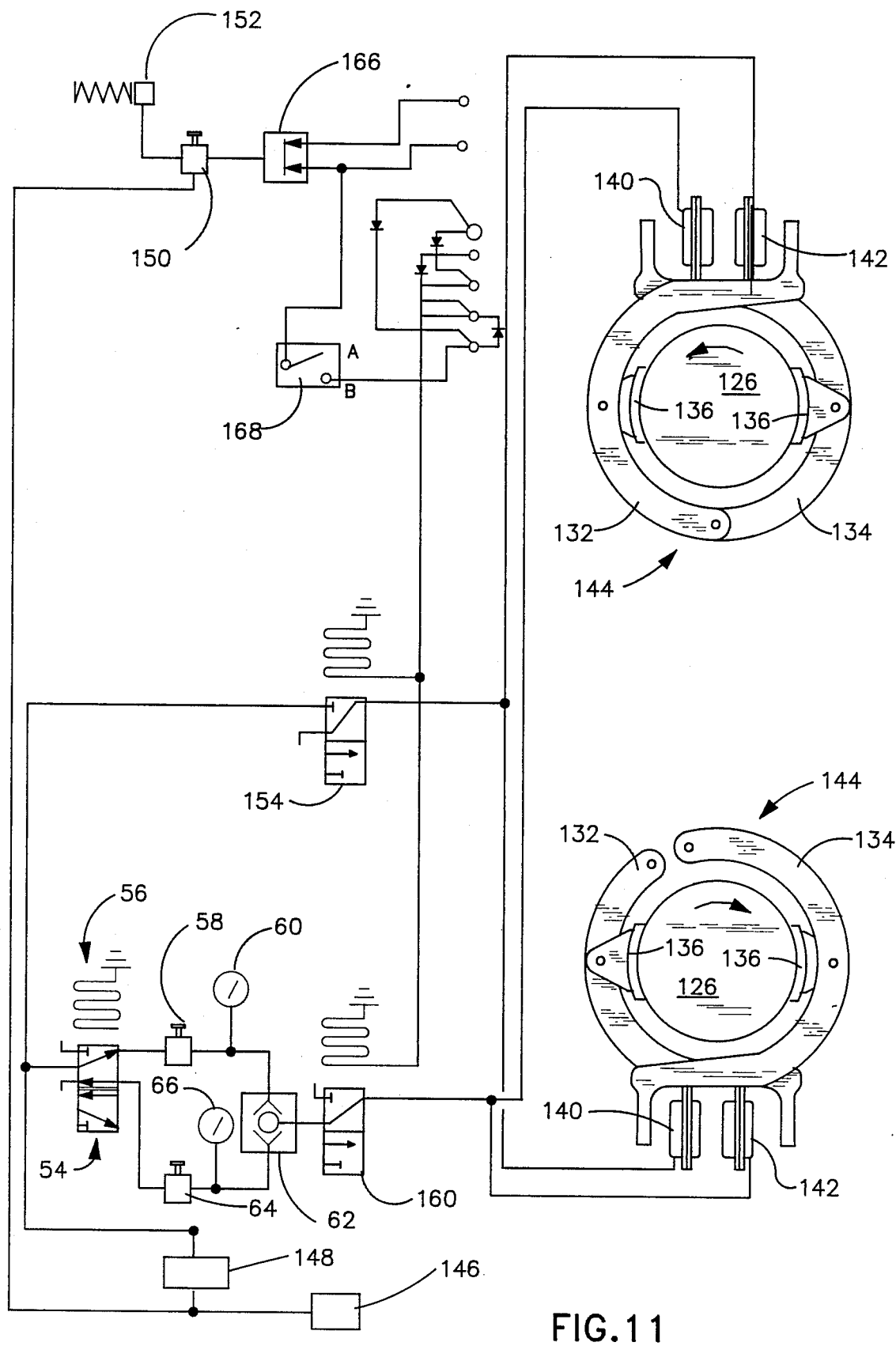
FIG. 11 is a schematic diagram of the pneumatic system for braking the reels used in the system of the present invention, which is a modification of the braking system described in U.S. Pat. No. 4,643,370.

There is shown in FIG. 11 a brake system in all respects like the brake system shown in FIG. 19 of U.S. Pat. No. 4,643,370, the subject matter of which is incorporated herein by reference, except that the variable pressure regulator 156 and the pressure gauge 158 are replaced with a system for selecting between two different variable braking forces. The system includes a combination valve 54 which is in pneumatic communication with a source of pressurized gas 146 via a safety valve 148. The combination valve 54 is positioned by selectively activating a solenoid 56. In one position, the combination valve delivers pressurized gas from the pressurized gas source 146, to a first adjustable pressure regulator 58, a first pressure gauge 60, to a floating ball valve 62, and then to the valve 160. When the combination valve 54 is in a second position, the pressurized gas from the pressurized gas source 146 is delivered to a second adjustable pressure regulator 64, to a second pressure gauge 66, to the floating ball valve 62, and then to the valve 160. The first adjustable pressure regulator 58 is limited to a maximum relatively high pressure, such as sixty pounds per square inch, and the second adjustable pressure regulator 64 is limited to a maximum relatively low pressure, such as fifteen pounds per square inch. When cable is being unwound from the reels 10, 12, the braking friction is overcome by the forces pulling the cable off the reels, such as the forces produced by vehicle movement. However, when the forces pulling the cable off the reels 10, 12 cease, such as when the vehicle slows or stops, the braking friction inhibits the rotation of the reels 10, 12, and thereby substantially prevents unwanted pay-out of cable. It is desirable that the relatively light braking friction being applied to the reels 10, 12 when using fiber optic cable be significantly less than the relatively high braking friction being applied to the reels 10, 12 when using (relatively heavy) conventional cable. Consequently, the solenoid 56 may be selectively activated to position combination valve 54 to provide the desired pressure and associated braking friction to the reels 10, 12 depending upon whether fiber optic cable or conventional cable is being unreeled.

Figure 12:
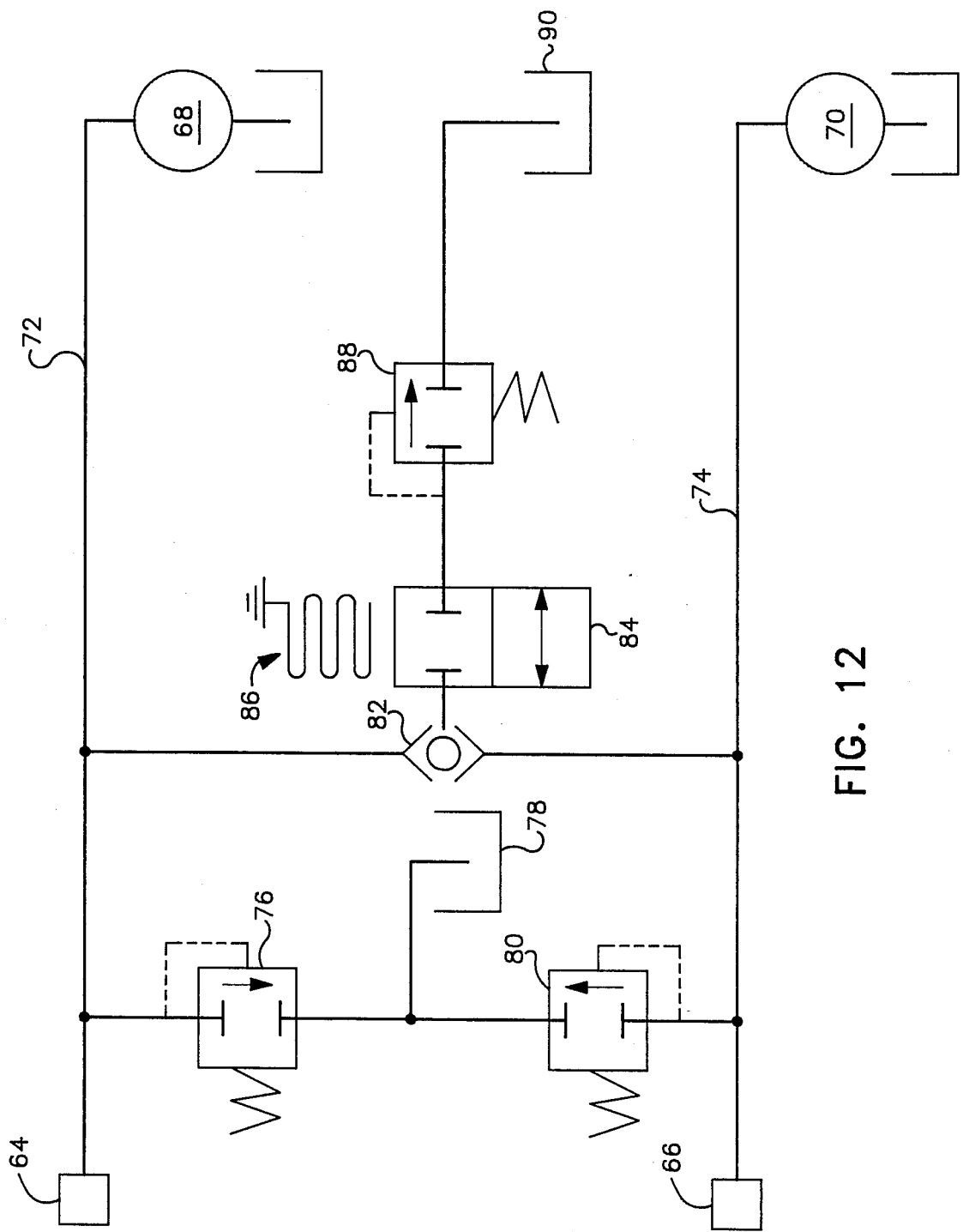
FIG. 12 is a schematic diagram of the hydraulic system for driving the reels in the system of the present invention.

The present invention also contemplates a reel drive system to rotate the reels 10, 12 for rewinding cable. As shown in FIG. 12, the reel drive system includes an associated source of pressurized fluid 64, 66 and an associated hydraulic motor 68, 70 for each reel 10, 12. A first delivery conduit 72 is in fluid communication between the pressurized fluid source 64 and the associated hydraulic motor 68, and a second delivery conduit 74 is in fluid communication between the pressurized fluid source 66 and the associated hydraulic motor 70. A relief valve 76 is in fluid communication between the first delivery conduit 72 and a tank or reservoir 78, and a second relief valve 80 is in fluid communication between the second discharge conduit 74 and the tank 78. Each of these relief valves 76, 80 is set at a relatively high pressure, so that if the pressure of the fluid within the associated delivery conduit 72, 74 exceeds a relatively high pressure, then the relief valves 76, 80 will open the fluid communication between such conduit and the tank 78. Interposed between the first delivery conduit 72 and the second delivery conduit 74 is a shuttle valve 82, which in turn is in fluid communication with a valve 84 which is actuated by a solenoid 86 into either an open free flow position or a closed position. The valve 84 is in fluid communication with a relief valve 88, which in turn is in fluid communication with a tank or reservoir 90. The relief valve 88 is set at a predetermined pressure lower than the pressure at which the relief valves 76 and 78 are set.

The reel drive system operates as follows. When rewinding relatively heavy conventional cable onto a reel, or when tensioning suspended aerial cable, it is customary for the cable to experience relatively high tensions which do not harm the cable. So, when rewinding or tensioning conventional cable, the solenoid 86 is actuated such that the valve 84 is in a closed position. The relief valves 76, 80 will open when the pressure in the associated delivery conduit 72, 74 exceeds a relatively high predetermined level. When relatively light fiber optic cable is being rewound to a reel, the solenoid 86 is actuated so that the valve 84 is in an open position to permit fluid communication between the shuttle valve 82 and the relief valve 88. Since the pressure relief valve 88 is set at a pressure lower than the pressures at which the pressure relief valves 76, 80 are set, pressurized fluid will cease being delivered to the hydraulic motor 68, 70 when the pressure within the delivery conduit 72, 74 is at a relatively low predetermined level, thus ensuring that the tension in the fiber optic cable does not exceed a relatively low amount.

Although particular embodiments of the present invention have been described and illustrated herein, it should be recognized that modifications and variations may readily occur to those skilled in the art and that such modifications and variations may be made without departing from the spirit and scope of my invention. It should be especially recognized that the functions of the hydraulic system described herein may be performed by mechanical and electrical devices such as overrunning clutches. For example, see the mechanical and electrical clutches on pages 11, 12, 16, 50 and 98 of the Oct. 16, 1986 edition of *Machine Design* magazine. Consequently, my invention as claimed below may be practiced otherwise than as specifically described above.

I claim:

1. A system for aerially stringing communications cable comprising:
    a vehicle;
    an aerial boom mounted on said vehicle;
    a reel of non-fiber optic communications cable adapted to be mounted on said vehicle and adapted to be unreeled, passed along said boom, and aerially strung;
    a reel of fiber optic communications cable adapted to be mounted on said vehicle and adapted to be unreeled, passed along said boom, and aerially strung;
    a guide roller assembly mounted on said boom for guiding cable from a reel mounted on said vehicle and along said boom to the distal end of said boom, said guide roller assembly including at least one substantially circular, rotatable roller adapted to roll with said non-fiber optic cable as said non-fiber optic cable is unreeled, passed along said boom, and aerially strung while in substantially point contact with said non-fiber optic cable;
    a chute possessing a substantially curved interior surface adapted to direct said fiber optic cable as said fiber optic cable is unreeled, passed along said boom, and aerially strung while in substantially line contact with said fiber optic cable;
    means for interchangeably, selectively, releasably securing said chute to said guide roller assembly.

2. A system for aerially stringing communications cable according to claim 1 wherein said line contact is substantially at least two inches.

3. A system for aerially stringing communications cable according to claim 2 wherein said line contact is substantially at least four inches.

4. A system for aerially stringing communications chute according to claim wherein said cable includes a tunnel and said chute interior surface includes said tunnel wall.

5. A system for aerially stringing communications cable according to claim 4 wherein said chute tunnel wall is convex.

6. A system for aerially stringing communications cable according to claim 5 wherein said chute tunnel wall is fashioned substantially in the arc of a circle.

7. A system for aerially stringing communications cable according to claim 6 wherein said circle has a radius of substantially at least twelve inches.

8. A system for laying fiber optic cable comprising:
    a capstan wheel adapted to receive said cable such that said cable is looped at least once around the circumferential periphery of said wheel; and
    means for preventing said cable from overlapping itself along said wheel periphery.

9. A system for laying fiber optic cable according to claim 8 wherein said preventing means includes a blade substantially radially extending near said wheel periphery and positioned along said wheel periphery such that said blade is interposed between segments of said cable.

10. A system for laying fiber optic cable according to claim 9 wherein said blade is fashioned so as to produce substantially frictionless contact with said cable segments.

11. A system for laying fiber optic cable according to claim 9 wherein said wheel periphery is concave.

12. A system for laying fiber optic cable according to claim 9 further including means for retaining said cable proximately looped around said wheel periphery even when said cable is slack.

13. A system for laying fiber optic cable according to claim 12 wherein said retaining means includes a shroud spaced from and oriented substantially tangent to said wheel periphery.

14. A system for laying fiber optic cable according to claim 13 wherein said blade extends substantially radially inwardly toward said wheel periphery.

15. A system for laying fiber optic cable comprising:
    a capstan wheel adapted to receive said cable such that said cable is looped at least once around the circumferential periphery of said wheel; and
    means for retaining said cable proximately looped around said wheel periphery even when said cable is slack.

16. A system for laying fiber optic cable according to claim 15 further including means for preventing said cable from overlapping itself along said wheel periphery.

17. A system for laying fiber optic cable according to claim 16 wherein said preventing means includes a blade substantially radially extending near said wheel periphery and positioned along said wheel periphery such that said blade is interposed between segments of said cable.

18. A system for laying fiber optic cable according to claim 17 wherein said blade is fashioned so as to produce substantially frictionless contact with said cable segments.

19. A system for laying fiber optic cable according to claim 15 wherein said wheel periphery is concave.

20. A system for laying fiber optic cable according to claim 15 wherein said retaining means includes a shroud spaced from and oriented substantially tangent to said wheel periphery.

21. A system for laying fiber optic cable according to claim 20 wherein said blade extends substantially radially inwardly toward said wheel periphery.

22. A system for laying fiber optic cable comprising:
a vehicle;
a reel of fiber optic cable mounted on said vehicle and adapted to be unreeled;
a capstan wheel adapted to receive said cable from said reel such that said cable is looped around the circumferential periphery of said wheel;
means rotating said wheel at a predetermined radial speed whereby said cable becomes looped tightly around said periphery and said cable is pulled off and unreeled from said reel at least partly by said wheel;
means for pulling said cable off said wheel; and
first for enabling said wheel to freely overspin and rotate faster than said predetermined radial speed when said cable is pulled off said wheel at a rate faster than said predetermined radial speed.

23. A system for laying fiber optic cable according to claim 22 further comprising means for reducing the drive torque of said rotating means whenever said cable is pulled off said wheel by said cable pulling means such that the tension in said cable exceeds a predetermined amount whereby the torque of said wheel is correspondingly reduced.

24. A system for laying fiber optic cable according to claim 22 further comprising means for rewinding said cable onto said reel and means for disabling and rendering inoperative said rotating means when said cable is rewound onto said reel by said rewinding means such that said wheel freely rotates.

25. A system laying fiber optic cable according to claim 22 further comprising second means for selectively disabling and rendering inoperative said rotating means such that said wheel freely rotates.

26. A system for laying fiber optic cable according to claim 22 wherein said rotating means includes a source of pressurized fluid, a hydraulic motor, means for delivering the pressurized fluid from said source to said hydraulic motor, a fluid collection tank, and means for discharging the pressurized fluid from said hydraulic motor, to said tank and wherein said enabling means includes means for sensing the pressure of the pressurized fluid delivered to said hydraulic motor, means for sensing the pressure of the pressurized fluid discharged from said hydraulic motor, and means for recirculating the discharged pressurized fluid to said hydraulic motor whenever the pressure of the pressurized fluid discharged from said hydraulic motor exceeds the pressure of the pressurized fluid delivered to said hydraulic motor.

27. A system for laying fiber optic cable according to claim 22 wherein said rotating means includes a source of pressurized fluid, a hydraulic motor, a delivery conduit for delivering the pressurized fluid from said source to said hydraulic motor, a fluid collection tank, and a discharge conduit for discharging the pressurized fluid from said hydraulic motor to said tank and wherein said enabling means includes a one way floating ball valve in fluid communication with the pressurized fluid in said delivery conduit and in said discharge conduit whereby when the pressure of the pressurized fluid in said delivery conduit exceeds the pressure of the pressurized fluid in said discharge conduit, then said valve is closed, but when the pressure of the pressurized fluid in said delivery conduit is less than the pressure of the pressurized fluid in said discharge conduit, then said valve is open to permit fluid communication between said delivery conduit and said discharge conduit.

28. A system for laying fiber optic cable according to claim 23 wherein said rotating means includes a source of pressurized fluid, a hydraulic motor, means for delivering the pressurized fluid from said source to said hydraulic motor, a fluid collection tank, and means for discharging the pressurized fluid from said hydraulic motor to said tank and wherein said reducing means includes means for diverting the pressurized fluid being delivered to said hydraulic motor to said tank whenever the pressure of the pressurized fluid being delivered to said hydraulic motor exceeds a predetermined amount.

29. A system for laying fiber optic cable according to claim 25 wherein said rotating means includes a source of pressurized fluid, a hydraulic motor, a delivery conduit for delivering the pressurized fluid from said source to said hydraulic motor, a fluid collection tank, and a discharge conduit for discharging the pressurized fluid from said hydraulic motor to said tank and wherein said disabling means includes a means for selectively providing bidirectional free flow fluid communication between the pressurized fluid delivered to said hydraulic motor and the pressurized fluid discharged from said hydraulic motor.

30. A system for laying fiber optic cable according to claim 27 further comprising means for diverting the pressurized fluid being delivered to said hydraulic motor to said tank whenever the pressure of the pressurized fluid being delivered to said hydraulic motor exceeds a predetermined amount.

31. A system for laying fiber optic cable according to claim 27 further comprising means for selectively providing bidirectional free flow fluid communication between the pressurized fluid delivered to said hydraulic motor and the pressurized fluid discharged from said hydraulic motor.

32. A system for laying fiber optic cable according to claim 30 further comprising means for selectively providing bidirectional free flow fluid communication between the pressurized fluid delivered to said hydraulic motor and the pressurized fluid discharged from said hydraulic motor.

33. A system for laying fiber optic cable comprising:
a vehicle;
a reel of fiber optic cable mounted on said vehicle and adapted to be unreeled;
a capstan wheel adapted to receive said cable from said reel such that said cable is looped around the circumferential periphery of said wheel;
means for rotating said wheel at a predetermined radial speed whereby said cable becomes looped tightly around said wheel periphery and said cable is pulled off and unreeled from said reel at least partly by said wheel;

means for pulling said cable off said wheel;

means for rewinding said cable onto said reel; and means for disabling and rendering inoperative said rotating means when said cable is rewound onto said reel by said rewinding means such that said wheel freely rotates.

34. A system for laying fiber optic cable according to claim 33 wherein said rotating means includes a source of pressurized fluid, a hydraulic motor, a delivery conduit for delivering the pressurized fluid from said source to said hydraulic motor, a fluid collection tank, and a discharge conduit for discharging the pressurized fluid from said hydraulic motor to said tank and wherein said disabling means includes means for selectively providing bidirectional free flow fluid communication between the pressurized fluid delivered to said hydraulic motor and the pressurized fluid discharged from said hydraulic motor.

35. A system for laying communications cable comprising:

a reel of communications cable;

means for rewinding said cable onto said reel;

first means for disabling and rendering inoperative said rewinding means when the tension in said cable exceeds a first predetermined amount; and second means for selectively disabling and rendering inoperative said rewinding means when the tension in said cable exceeds a second predetermined amount less than said first predetermined amount.

36. A system for laying communications cable according to claim 35 wherein said rewinding means includes a source of pressurized fluid, a hydraulic motor, a delivery conduit for delivering the pressurized fluid from said source to said hydraulic motor, a fluid collection tank, and a discharge conduit for discharging the pressurized fluid from said hydraulic motor to said tank and wherein said first disabling means includes means for sensing the pressure of the pressurized fluid in said delivery conduit and means for diverting the pressurized fluid from said delivery conduit when the pressure of the pressurized fluid in said delivery conduit exceeds a first predetermined magnitude and wherein said second disabling means includes means for sensing the pressure of the pressurized fluid in said delivery conduit and means for diverting the pressurized fluid from said delivery conduit when the pressure of the pressurized fluid in said delivery conduit exceeds a second predetermined magnitude less than the first predetermined magnitude.

37. A system for laying communications cable comprising:

a wheeled vehicle;

parking means for selectively inhibiting the rotation of said vehicles wheels when said vehicle is parked;

a rotatable reel of communications cable mounted on said vehicle;

first means for inhibiting the rotation of said reel substantially at a first predetermined degree;

second means for inhibiting the rotation of said reel substantially at a second predetermined degree lower than the first predetermined degree;

third means for inhibiting the rotation of said reel substantially at a third predetermined degree lower than the first and second predetermined degrees;

first means for disabling and rendering inoperable said first inhibiting means when either of said second inhibiting means or said third inhibiting means inhibits the rotation of said reel;

means for disabling and rendering inoperable said second inhibiting means when said third inhibiting means inhibits the rotation of said reel; and means for disabling and rendering inoperative said third inhibiting means when said second inhibiting means inhibits the rotation of said reel.

38. A system for laying communication cable according to claim 37 further comprising means for rendering operable said first inhibiting means so that the rotation of said reel is inhibited substantially at a first predetermined degree when said parking means inhibits the rotation of said vehicle's wheels.

* * * * *